(12) United States Patent
Ptak et al.

(10) Patent No.: US 8,145,531 B1
(45) Date of Patent: Mar. 27, 2012

(54) PRODUCT SPECIFIC QUERIES TO DETERMINE PRESENCE OF BOTTOM-OF-BASKET ITEMS

(75) Inventors: Jennifer E. Ptak, Minneapolis, MN (US); Daniel J. Geiger, St. Michael, MN (US); Robert F. Foster, Ramsey, MN (US)

(73) Assignee: Target Brands, Inc., Minneapolis, MN (US)

( * ) Notice: Subject to any disclaimer, the term of this patent is extended or adjusted under 35 U.S.C. 154(b) by 128 days.

(21) Appl. No.: 12/831,084

(22) Filed: Jul. 6, 2010

(51) Int. Cl.
 G06Q 20/00 (2012.01)
 G06K 15/00 (2006.01)
 G06F 19/00 (2011.01)
 G06F 7/08 (2006.01)

(52) U.S. Cl. .......... 705/23; 235/383; 235/385; 235/381; 705/16

(58) Field of Classification Search .................. None
See application file for complete search history.

(56) References Cited

U.S. PATENT DOCUMENTS

| | | |
|---|---|---|
| 6,843,415 B2 | 1/2005 | Vogler |
| 7,219,838 B2 | 5/2007 | Brewster et al. |
| 7,242,300 B1 | 7/2007 | Konstad et al. |
| 2005/0189412 A1 | 9/2005 | Hudnut et al. |
| 2006/0289637 A1 | 12/2006 | Brice et al. |
| 2007/0084918 A1 | 4/2007 | Tabet et al. |
| 2008/0303902 A1 | 12/2008 | Romer et al. |

OTHER PUBLICATIONS

Evolution Robotics Retail, "StoreNext and Retalix to Offer LaneHawk System", Jul. 9, 2009, 2 pages.

*Primary Examiner* — Ryan Zeender
*Assistant Examiner* — Denisse Ortiz Roman
(74) *Attorney, Agent, or Firm* — Theodore M. Magee; Westman, Champlin & Kelly, P.A.

(57) ABSTRACT

In one implementation, products in a shopping cart are provided to a point of sale system. The products are removed from the shopping cart and scanned with a transducer system. A database association system queries a database and determines the likelihood that the scanned products are indicative of products located in a lower support unit of the shopping cart. A notification is displayed on a user interface indicating the possibility of products located in the lower support unit of the shopping cart. A user is then queried as to whether a product was located in the lower support unit and the association system is updated to reflect a revised probability that the scanned products are indicative of products located in a lower support unit of the shopping cart.

20 Claims, 7 Drawing Sheets

Please inspect the bottom support of the shopping cart for store product. —402a

404a

Did you locate any store products on the bottom support of the shopping cart?

| Yes 406 | No 408 |

Please inspect the bottom support of the shopping cart for store product and scan in all store products found. Once all store products have been scanned in, please scan the bar code located on the bottom support of the cart.

412

—410

If there are no products located on the bottom support of the shopping cart, please scan the bar code located on the bottom support of the cart.

PRODUCT SPECIFIC QUERIES TO DETERMINE PRESENCE OF BOTTOM-OF-BASKET ITEMS

BACKGROUND

Consumers purchase products in retail stores and online over the Internet. Shopping at a retail store sometimes allows consumers the ability to use interactive displays of products or use products they are shopping for before the consumer completes a purchase. Shopping online allows consumers to interact with pictures, videos, and/or audio clips relating to the products the consumer is considering for purchase. Retail store employees often provide help in selecting what type of product a consumer is looking for or what features the product should have.

Point of sale systems allow consumers to purchase products from retail stores. Store employees sell products to consumers by ringing up a sales transaction; either after helping the consumer locate a product or after the consumer located a product on their own. Point of sale systems scan universal product codes (UPC) in order to determine the price of products and add the product and associated price to the sales transaction. After all products have been added to a transaction, the point of sale system adds sales tax for the appropriate products. Consumers pay for products and sales tax at a point of sale system using cash, checks, or credit cards.

Point of sale systems can include graphical user interfaces (GUIs). GUIs sometimes display an electronic version of a sales transaction before a receipt is printed. If there is an error in the sales transaction, the error can be corrected before a receipt is printed, reducing the amount of paper needed for each transaction. Similarly, the point of sale system groups similar items so that they appear together on the printed receipt. Some point of sale systems print receipts as each item is added to a sales transaction.

Inventory tracking systems allow retail businesses to keep track of inventory and determine when additional products need to be ordered. Some electronic inventory tracking systems communicate with point of sale systems and warehouses to keep track of the product inventory at retail stores. When stock levels of products reach or are below a predetermined level, additional stock can be requested from a warehouse. Electronic inventory tracking systems track sales and returns of products over time. Sales and returns data is analyzed to determine trends, such as sales volume during different times of the year. Inventory systems can update stock levels throughout the year in order to adjust for changes in sales volume. Sometimes employees of a retail store manually scan all products of the retail store in order to verify the actual stock levels of products and to update product stock information in the inventory tracking system.

SUMMARY

In one implementation, products in a shopping cart are provided to a point of sale system. The products may be removed from the shopping cart and scanned with a transducer system. A database association system may query a database and determine the likelihood that a scanned product is indicative of products located in a lower support unit of the shopping cart. A notification may be displayed on a user interface indicating the possibility of products located in the lower support unit of the shopping cart.

In other implementations, an association analytics module analyzes product association data and sales trends data in order to update the product association data stored in a database. For example, the association analytics module uses product price, product size, product weight, product type, and associated product types to determine the likelihood that, when a customer purchases a certain product, a complementary product will be located in a lower support unit of their shopping cart.

In certain implementations, the notification is presented to a cashier and instructs the cashier to inspect a lower support unit of a customer's shopping cart for products located in the lower support. In some implementations, the user interface receives input from the user indicating whether or not the user located a product in the lower support unit.

In still other implementations, an association analytics module updates data parameters associated with products in order to more accurately determine if a product is indicative of complementary products in a lower support unit of a shopping cart. For example, the association analytics module uses artificial intelligence in determining if a first product is indicative of products in the lower support unit of a shopping cart, and input received indicating whether a complementary product was found in a lower support unit is used to modify or update the algorithm in order to improve the probability that a complementary product will be found in response to a notification.

The details of one or more implementations are set forth in the accompanying drawing and description below. Other features, objects, and advantages will be apparent from the description and drawings, and from the claims.

DESCRIPTION OF DRAWINGS

Like reference symbols in various drawing indicate like elements.

DETAILED DESCRIPTION OF ILLUSTRATIVE IMPLEMENTATIONS

Customers in retail stores occasionally place items in a lower support of a shopping cart before going to a point of sale system. The items are either store products or the personal belongings of a customer. Sometimes registers, or other components of a point of sale system, partially block a cashier's view of the lower support of shopping carts. One method for determining the possibility of store products located in the lower support of a shopping cart uses product association data of products scanned during a sales transaction at the point of sale system. The product association data is used to determine whether the scanned products are suggestive of products likely being located in the lower support of the shopping cart. Products located in the lower support of shopping carts are sometimes referred to as bottom of basket products. Product association data includes product count, product type, product value, and product size. The method optionally uses artificial intelligence algorithms in determining the likelihood of bottom of basket products in the shopping cart. The point of sale system displays a prompt to a cashier if the possibility of bottom of basket products is above a threshold value. In some implementations, the point of sale system receives input from the cashier indicating whether there was in fact a bottom of basket product. In certain implementations, the input received from the cashier is used to train the algorithm used to determine the likelihood of bottom of basket products.

Figure 1:
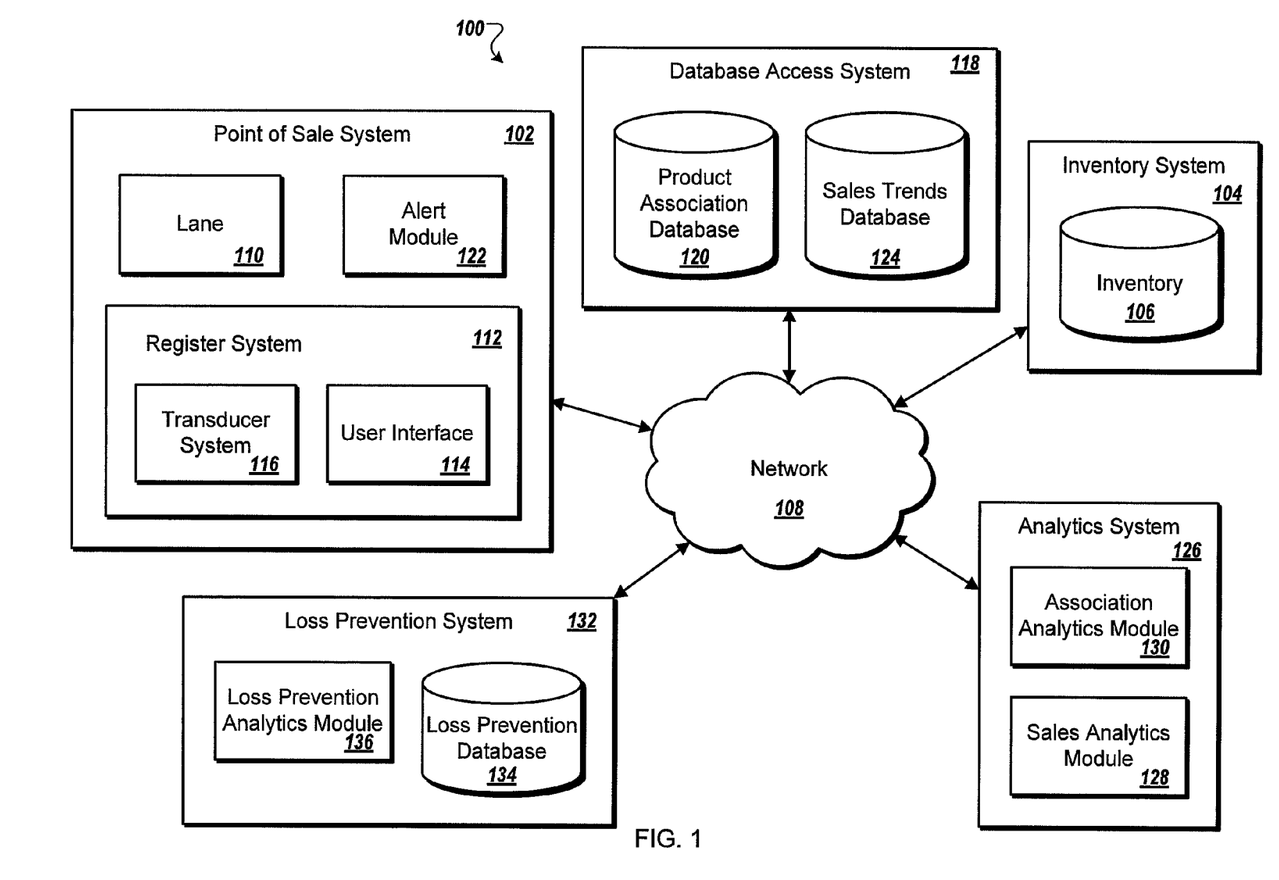
FIG. 1 shows an example of a system for selling products from a retail store.

FIG. 1 shows an example of a system 100 for conducting transactions at a store, such as product sales, returns and exchanges, and storing transaction data. The system 100 analyzes the transaction data in order to find trends in the data and monitors product inventory levels in order to determine when additional product should be ordered. The system 100 processes transactions at a point of sale system 102 and updates an inventory system 104 appropriately. The point of sale system 102 is alternatively a transaction system or a checkout system. The inventory system 104 includes an inventory database 106 for keeping track of product stock levels at the store. In some implementations, the inventory database 106 includes information on both unopened stock levels and the stock levels of returned products.

The system 100 includes a network 108 connected to the point of sale system 102 and the inventory system 104. When sales transactions are finalized at the point of sale system 102, the point of sale system 102 sends a message to the inventory system 104 through the network 108. The sales message includes a UPC code and a product count for each of the products sold and the inventory database 106 is updated accordingly. The network 108 is a local area network at a retail store. In other implementations, the network 108 is an intranet that connects a plurality of stores together. Each of the stores has a plurality of point of sales systems and a single inventory system. In other implementations, the stores share an inventory system. In some implementations, the network 108 is the Internet, and messages between the point of sale system 102 and the inventory system 104 are sent in encrypted packets across the network 108.

In some implementations, systems other than point of sale systems, such as the point of sale system 102, are used for sale, return, and exchange transactions. For example, a return system (not shown) located at a customer service counter in a store is used to process returns and exchanges. The return system optionally processes sales transactions. In certain implementations, kiosks (not shown), such as an electronics department kiosk, a jewelry department kiosk, a men's department kiosk, or a pharmacy kiosk, are used to process sales transactions. Each of the systems or kiosks for processing sales, returns, or exchanges is connected to the network 108 so that the systems communicate across the network 108 with other systems, such as the inventory system 104.

The point of sale system 102 is used to scan customer products during a sales transaction and to finalize the sale. During finalization of the sales transaction, a customer pays for the products scanned during the transaction with a payment method. Payment methods include cash, check, gift card, and credit card. The point of sale system 102 includes a lane 110 for a customer to bring products to the point of sale system 102 for purchase. A customer with products placed in a shopping cart moves the shopping cart into the lane 110 in order to begin a sales transaction. In other implementations, the customer places selected products on an alternative type of transport device used for moving products throughout a store before purchasing the products at the point of sale system 102, such as a wheeled flatbed. The transport device optionally has two or more product support units or shelves.

The point of sale system 102 includes a register system 112 for a cashier to use during sales transactions. The register system 112 allows a cashier to scan products, update product quantities, and finalize sales transactions. The register system 112 looks up product prices for the cashier. The register system 112 includes a user interface 114 for receiving cashier input during sales transactions. For example, the user interface 114 is a graphical interface presented to a cashier on a display. The user interface 114 receives an employee identification (ID) number from a cashier when the cashier logs onto the register system 112. In some implementations, the user interface 114 receives both an employee ID number and a password from a cashier when the cashier logs onto the register system 112.

The register system 112 includes a transducer system 116 for scanning UPC codes located on products removed from a customer's cart. In some implementations, the transducer system 116 is a bar code reader or a scanning apparatus used to scan UPC codes. In other implementations, the transducer system 116 is a radio frequency (RF) antenna used to detect product information from radio frequency identification (RFID) tags located on products. The point of sale system 102 uses the scanned UPC codes to send price lookup queries for the scanned products. The system 100 includes a database access system 118 that receives a price lookup query with a scanned UPC code from the point of sale system 102. The database access system 118 performs a query on a product association database 120 included in the database access system 118 to determine the product price. The database access system 118 sends the price information to the point of sale system 102. The point of sale system 102 forwards the price information to the register system 112. The point of sale system 102 and the database access system 118 communicate over the network 108. The register system 112 uses the price information for making a sales receipt as products are scanned in during a sales transaction. In some implementations, the product association database 120 is a file system.

If the database access system 118 cannot find a UPC code or a product price in the product association database 120, the database access system 118 sends an alert to the point of sale system 102. The point of sale system 102 includes an alert module 122 for receiving and handling alerts sent to the point of sale system 102. When the alert module 122 receives an alert from the database access system 118, the alert module 122 indentifies the type of alert and what procedures to take based on the alert type. For example, if the alert module 122 receives an "unrecognized UPC code" alert from the database access system 118, then the alert module 122 optionally sends a price lookup query to the inventory system 104 in order to determine the price for the scanned product. If the alert module 122 is unable to locate information that will resolve the alert by communication with other systems connected to the network 108, the alert module 122 displays a notification on the user interface 114 notifying the cashier of the problem. The cashier will then take the necessary steps to resolve the alert based on the type of alert. For example, if the product has a price tag located on the packaging of the product, the cashier will manually enter the price information. In other implementations, the cashier will notify a manager or a team lead of the problem and the manager or team lead will help resolve the issue.

The database access system 118 is located on a computer device in the same store as the point of sale system 102. In some implementations, the database access system 118 is located in a regional office or warehouse and is accessed by all point of sale systems in the same region. For example, the point of sale system 102 communicates with the database access system 118 through the network 108 and the network 108 is an intranet.

The product association database 120 includes product parameters, such as product price, product size, product type, product status, associated products, and a bottom of basket value. Product types include beverages, paper products, office supplies, and summer seasonal products, to name a few examples. Product status data includes information indicating if the product is new (e.g., a store using the system 100 recently started selling the product), if the product is on sale, if the product price was recently reduced, and/or if the product is a clearance item.

Associated product information includes data regarding products that are often sold with a product. In some implementations, the product association database 120 stores associated product type information instead of information identifying each individual associated product. For example, if customers buying toothbrushes often purchase toothpaste during the same transaction at a store, the product association database 120 would include data showing that a purchase of a toothbrush indicates the possibility of a purchase of toothpaste during the same transaction.

The bottom of basket value indicates the likelihood that an associated product is located in a lower support of a customer's shopping cart. For example, a customer purchasing a toothbrush has a low probability that toothpaste is located in the lower support of the customer's shopping cart. The bottom of basket values for toothbrushes would reflect the low probability of bottom of basket toothpaste. In other implementations, the bottom of basket value indicates the likelihood that any type of product is located in a lower support of a customer's shopping cart. For example, customers buying large products, such as bulk toilet paper or a vacuum, have a high probability that they placed a product in the lower support of their shopping cart. The bottom of basket values for toilet paper and vacuums reflect the high probability.

The database access system 118 includes a sales trends database 124 that tracks sales and sales trends over time. For each sale, return, and exchange transaction finalized at the point of sale system 102, transaction information is sent from the point of sale system 102 through the network 108 to the database access system 118. The database access system 118 updates the sales trends database 124 accordingly with the transaction data. In some implementations, the sales trends database 124 stores data indicating if a sales transaction included products that were located in the lower support of a shopping cart.

The system 100 includes an analytics system 126 for analyzing data and extrapolating relationship information, such as sales trends and product association data. In some implementations, the analytics system 126 is located on a computer included in the point of sale system 102. In other implementations, the analytics system 126 is located on the same computer device as the database access system 118. The analytics system 126 is connected to the network 108 and communicates with the point of sale system 102 and the database access system 118 through the network 108. The analytics system 126 includes a sales analytics module 128 that analyzes sales data stored on the sales trends database 124 and determines sales trends across the fiscal year, across the calendar year, and from year to year. The sales analytics module 128 stores the trends data on the sales trends database 124.

The sales analytics module 128 analyzes the sales data stored on the sales trends database 124 in real time (e.g., the sales analytics module analyzes new sales data as it is added to the sales trends database 124). In other implementations, the sales analytics module 128 analyzes new sales data on a schedule. Schedules include nightly (e.g., starting at midnight), weekly (e.g., every Sunday), bi-weekly, and monthly, to name a few examples.

The analytics system 126 includes an association analytics module 130 to determine whether products are indicative of bottom of basket products. The association analytics module 130 or another suitable identification module analyzes data stored in the product association database 120 to determine the likelihood that a shopping cart contains bottom of basket products. In some implementations, the association analytics module 130 uses data from the point of sale system 102, such as the total number of items in a sales transaction or the total cost of the sales transaction, to determine the likelihood a shopping cart contains products located on the lower support unit. In some implementations, the association analytics module 130 uses the bottom of basket values as weights in order to determine the likelihood of bottom of basket products. In other implementations, the association analytics module 130 uses more than one weight or bottom of basket value to determine the likelihood of bottom of basket products. For example, the association analytics module 130 can use one weight for each of the product price, product size, product type, and product status.

The association analytics module 130 uses artificial intelligence (AI) to determine the likelihood of bottom of basket products. The association analytics module 130 updates the bottom of basket values during training of the association analytics module 130. The association analytics module 130 is trained in order to more accurately predict the likelihood of bottom of basket products. For example, the association analytics module 130 uses a neural network to update the bottom of basket values. Alternatively, the association analytics module 130 uses a probabilistic method for determining and updating the bottom of basket values.

The association analytics module 130 is trained as sales transactions are completed at the point of sale system 102 in order to more accurately predict the possibility of bottom of basket products. Indication of products located in the lower support unit of a shopping cart, such as user input received by the user interface 114, is used as input to the association analytics module 130 during training. The indication includes either positive identification of bottom of basket products, or identification that no products were located on the lower support unit. In some implementations, sales transactions that do not include shopping carts are not used during training of the association analytics module 130.

In some implementations, the association analytics module 130 uses sales transaction data stored on the sales trends database 124 during training instead of training as sales transactions are completed at the point of sale system 102. The association analytics module 130 is optionally trained using a schedule. The association analytics module 130 is trained bi-monthly, monthly, or seasonally, to name a few examples.

Accurate prediction of bottom of basket products increases the chance that bottom of basket products are scanned with the transducer system 116 during sales transactions. Increasing the number of bottom of basket products entered during transactions reduces store losses and increases profitability.

The system 100 includes a loss prevention system 132 for detecting items located on a lower support of a customer's shopping cart. The loss prevention system 132 is located in the same store as the point of sale system 102. Sometimes customers place personal belongings on the lower support that should not be added to sales transactions. When the loss prevention system 132 detects an item located in the lower support of a shopping cart, the loss prevention system 132 updates a loss prevention database 134.

The loss prevention system 132 includes a loss prevention analytics module 136. The loss prevention system 132 is connected to the network 108 for communication with other systems connected to the network, such as the point of sale system 102, the database access system 118, and the analytics system 126. The loss prevention analytics module 136 optionally queries the sales trends database 124 for the number of sales transactions that had a bottom of basket product. The loss prevention analytics module 136 queries the loss prevention database 134 for the number of times an item was detected in the lower support of a shopping cart. The loss prevention analytics module 136 calculates a bottom of basket percentage by dividing the total number of bottom of basket transactions by the number of times an item was detected in the lower support during a transaction.

The loss prevention analytics module 136 analyzes the bottom of basket percentage to determine daily, monthly, seasonal, and year to year trends. The loss prevention analytics module 136 stores the bottom of basket percentage trends in the loss prevention database 134. In some implementations, the association analytics module 130 uses values from the bottom of basket percentage trends as input for determining the likelihood that a shopping cart contains bottom of basket products. In some implementations, the association analytics module 130 uses the bottom of basket percentage during training.

Figure 2A:
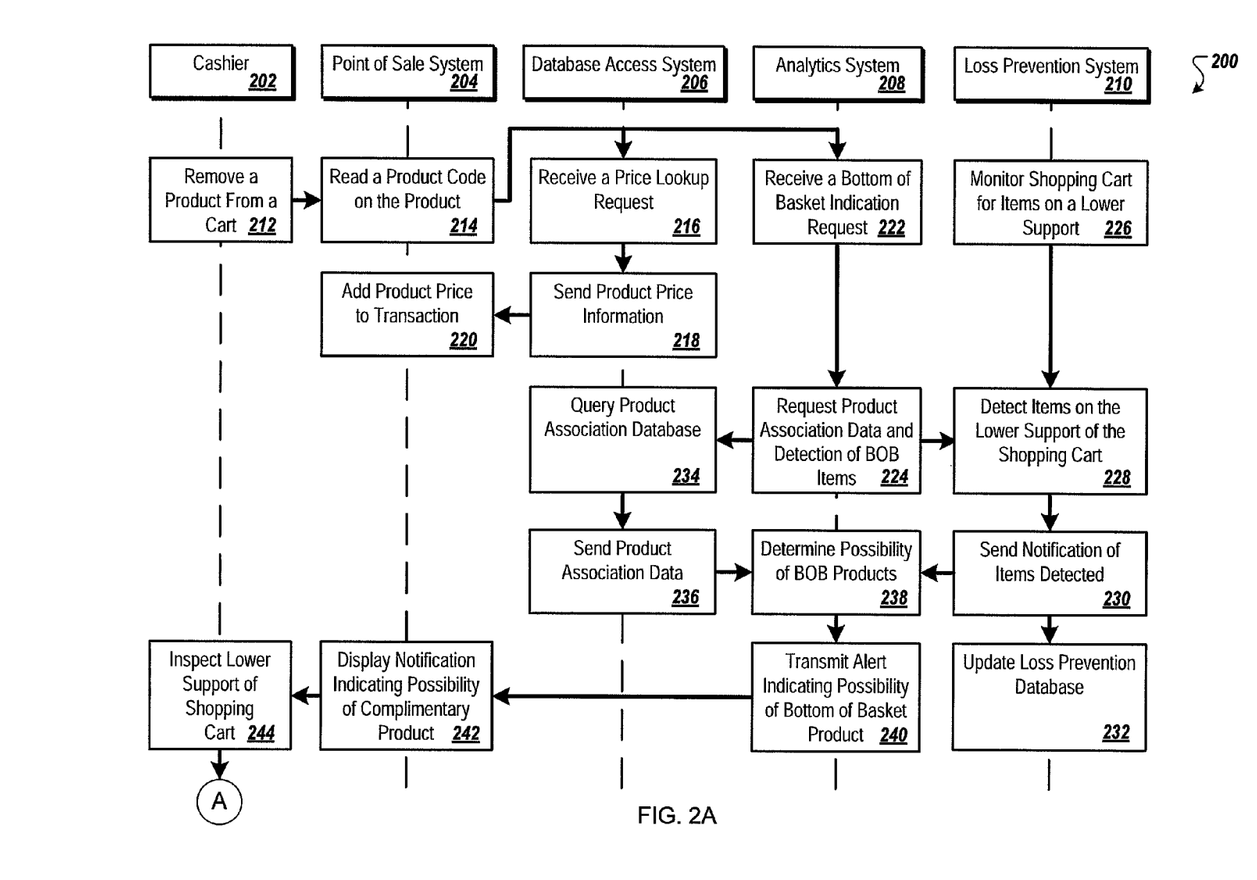
FIGS. 2A-B show a swim lane diagram of an example process for adjusting product association data based on items found in a shopping cart lower support.
Figure 2B:
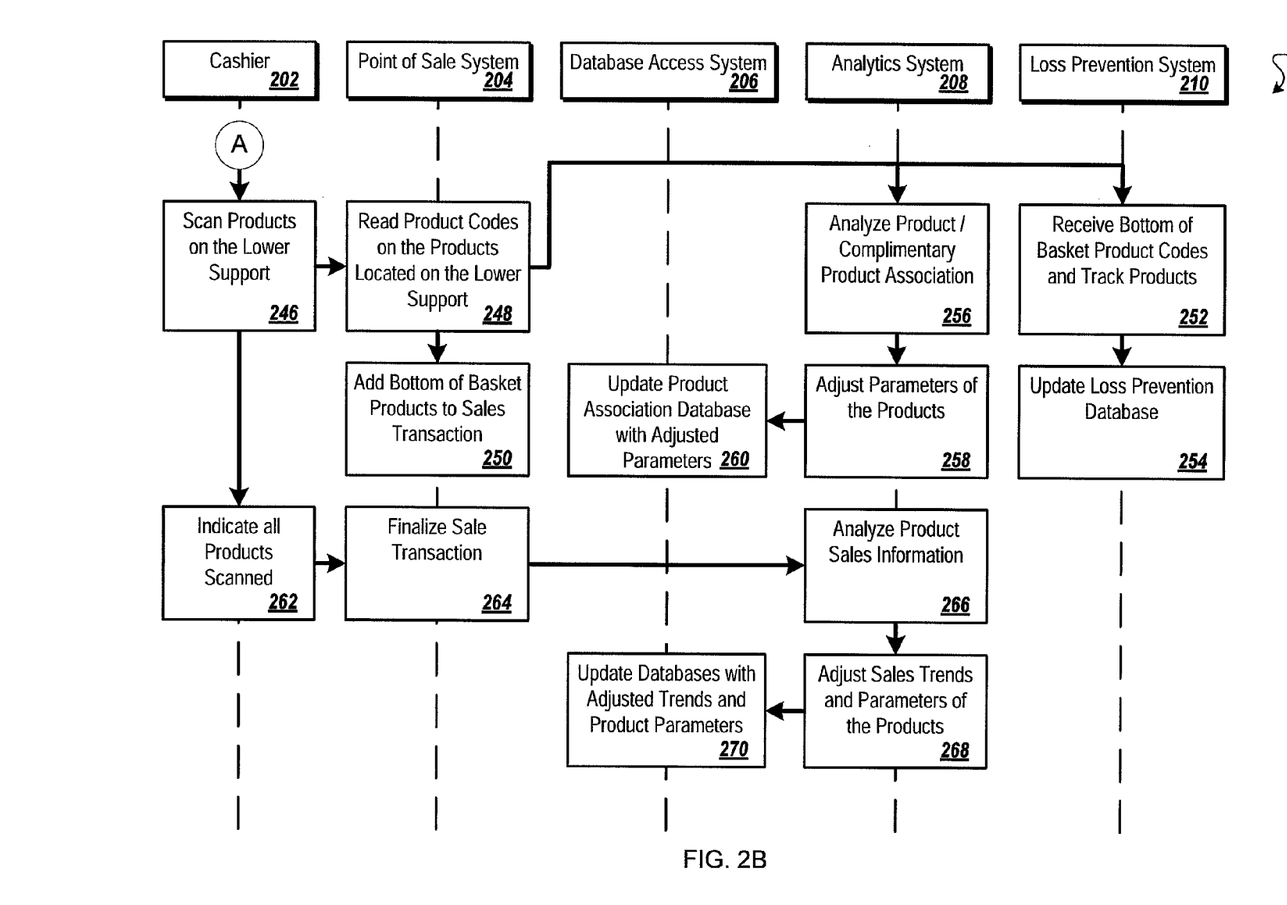

FIGS. 2A-B show a swim lane diagram of an example procedure 200 for updating product association data. The procedure 200 is used in a system, such as the system 100, to retrieve and update product parameters that indicate the possibility that a complementary product is located in a lower support unit of a customer's shopping cart. The parameters include product count, product type, product size, product weight, product value, and bottom of basket value, to name a few examples.

A cashier 202 in a store removes products from a customer's shopping cart. The cashier 202 uses a point of sale system 204 to scan each product in the shopping cart with a scanner, creating a sales transaction. A database access system 206 includes databases that contain product and sales data. The database access system 206 optionally includes data for all stores in the same region. In other implementations, the database access system 206 includes data for a single store. An analytics system 208 analyzes product and sales data in order to determine trends in the data. Some trends include sales trends and product association trends (e.g., products that are often purchased during the same transaction). A loss prevention system 210 monitors the store for potential lost sales.

The cashier 202 removes (212) a product from a customer's shopping cart. For example, the cashier 202 removes a Blu-ray player from an upper support unit in the customer's shopping cart. The point of sale system 204 reads (214) a product code located on the product removed from the customer's shopping cart. For example, the cashier 202 uses a transducer system to scan the UPC code of the product into the point of sale system 204. Alternatively, the point of sale system 204 reads product identification or product information located on the product removed from the customer's shopping cart.

The database access system 206 receives (216) a price lookup request for the product scanned by the cashier 202. The database access system 206 queries a product association database, such as the product association database 120, for the price of the product identified by the scanned UPC code. The database access system 206 receives the product price information from the product association database and sends (218) the product price information to the point of sale system 204. If the product association database does not contain a record associated with the scanned UPC code or does not contain a price associated with the scanned UPC code, the database access system 206 sends an alert to the point of sale system 204 indicating that no price information was found. The point of sale system 204 adds (220) the product price to the sales transaction. For example, the point of sale system 204 adds the price of the Blu-ray player to the transaction total.

The analytics system 208 receives (222) a bottom of basket product indication request from the point of sale system 204. For example, the point of sale system 204 needs to determine if a user interface should present a notification to the cashier 202 indicating the possibility of products located in the lower support of the customer's shopping cart. In some implementations, the bottom of basket indication request includes the total number of products scanned during the current sales transaction and the total price of the scanned products. An association analytics module, such as the association analytics module 130, requests (224) product association data from the database access system 206 and requests from the loss prevention system 210 indication of items detected in the lower support of the shopping cart.

Cameras connected to the loss prevention system 210 monitor (226) the customer's shopping cart for indication of items located on the lower support unit of the shopping cart. For example, the cameras monitor for store product or personal items belonging to the customer placed on the lower support. A loss prevention analytics module, such as the loss prevention analytics module 136, receives input from the cameras and detects (228) items located on the lower support of the customer's shopping cart. The loss prevention system 210 sends (230) notification to the association analytics module that items were detected on the lower support unit. Alternatively, the loss prevention system 210 sends notification to the association analytics module that items were not detected on the lower support unit. The loss prevention analytics module updates (232) a loss prevention database, such as the loss prevention database 134, with data indicating the percent of transactions that include bottom of basket items.

The database access system 206 queries (234) the product association database for data associated with the UPC code. The database access system 206 sends (236) the data associated with the UPC code to the association analytics module. The data associated with the UPC code includes product type, product size, product price, associated products, and bottom of basket value.

The association analytics module uses the parameters received from the point of sale system 204, the database access system 206, and the loss prevention system 210 to determine the likelihood that the scanned product indicates a complementary product located in the lower support unit of the shopping cart. The parameters used by the association analytics module optionally include the total number of products scanned, total cost of the scanned products, weight, price, or size of the most recently scanned product, products associated with the scanned product, the bottom of basket value associated with the scanned product, and notification of bottom of basket items. The association analytics module determines (238) the possibility that the customer's shopping cart includes bottom of basket products.

If no items were detected by the loss prevention analytics module during step 228, the association analytics module determines that there are no bottom of basket products in the customer's shopping cart. Otherwise, if the loss prevention analytics module detected items in the lower support of the customer's shopping cart, the association analytics module determines the possibility that the items in the lower support of the customer's shopping cart are store products. The association analytics module uses the parameters received from the point of sale system 204 and the database access system 206 as input.

If the association analytics module determines that the possibility of the bottom of basket items are store products is above a threshold value, such as 60%, the analytics system 208 transmits (240) an alert to the point of sale system 204 indicating the possibility of bottom of basket products. In other implementations, an alert is sent if the possibility of products located in the lower support unit is greater than 70%. In certain implementations, the point of sale system 204 receives an alert indicating the possibility of bottom of basket products if the possibility is greater than 80%.

In some implementations, the association analytics module determines that the possibility of bottom of basket products is greater than 60% based on the number of products added to the sales transaction so far. For example, the addition of the scanned product to a transaction raises the total number of products to a value such that the association analytics module determines the possibility of a bottom of basket product is 83%. This indicates that the upper support of the shopping cart is likely to be full, and the customer needed to place additional products on the lower support. In some implementations, the association analytics module determines that the possibility of products located in the lower support of the cart is greater than the threshold value based on the size of the products in the transaction. For example, if the total size or volume of the products scanned during a sales transaction is greater than the maximum volume an upper support unit holds, the cashier 202 should inspect the lower support unit for additional products.

In certain implementations, the type of product scanned indicates the likelihood of bottom of basket products. For example, if Blu-ray players are often purchased with a television stand, the association analytics module uses product association parameters to determine the likelihood the customer will purchase a television stand and place the television stand in the lower support of their shopping cart. In some implementations, if the association analytics module determines that most customers purchase a quantity greater than one of certain types of products, such as cases of soft drinks, purchase of one of the types of products would indicate the possibility of bottom of basket products. For example, if the customer purchases a case of pop the association analytics module would determine that the likelihood of additional cases in the lower support unit is above the threshold value.

In some implementations, the status of the product indicates the likelihood of products being located on the lower support. For example, when a number of seasonal clearance products are located in the upper support of the shopping cart, the association analytics module determines that the likelihood of similar products located on the lower support unit is above the threshold value (e.g., the likelihood is 71.5%).

In some implementations, the association analytics module determines that the possibility of complementary products located in the lower support unit of a shopping cart is below the threshold value, and no notification is sent to the point of sale system. For example, the customer is in an express lane purchasing a total of eight products and the association analytics module determines that none of the eight products is indicative of complementary products located in the lower support of the shopping cart.

The point of sale system 204 receives the alert indicating the possibility of bottom of basket products and sends the alert to an alert module, such as the alert module 122. The alert module determines the type of alert received and displays (242) a notification on a user interface, such as the user interface 114, indicating the possibility of a complementary product located in the lower support unit of the customer's shopping cart. The complementary product is a product often purchased at the same time as the scanned product. For example, a customer purchasing a vacuum often purchases vacuum bags and sometimes places the vacuum bags in a lower support unit of a shopping cart.

In other implementations, purchases of the scanned product often have complementary products located in the lower support of the shopping cart, and the parameters of the scanned product do not indicate a product type for the complementary product. For example, purchase of a large plastic tote is indicative of the possibility of a bottom of basket product, but does not indicate what type of product might be placed in the lower support unit.

The cashier 202 inspects (244) the lower support of the customer's shopping cart for products. The user interface receives feedback from the cashier 202 indicating whether products were located in the lower support unit of the shopping cart before scanning additional products. In some implementations, presentation of the notification prevents the cashier 202 from scanning additional products until the user interface receives feedback from the cashier 202. The cashier 202 scans (246) the bottom of basket products located on the lower support of the customer's shopping cart, adding each product to the sales transaction.

In some implementations, the user interface continues to display the bottom of basket notification while the cashier 202 scans the bottom of basket products. While the notification is displayed, the point of sale system 204 identifies each of the scanned bottom of basket products as being located in the lower support. When the last bottom of basket product is scanned, the cashier 202 scans a bar code on the lower support of the customer's shopping cart. The user interface recognizes the bar code as indicating that the cashier 202 inspected the lower support unit of the customer's shopping cart and the point of sale system 204 determines if there where bottom of basket products purchased based on if any products were scanned while the notification was displayed on the user interface.

The point of sale system 204 reads (248) product codes on the bottom of basket products. The point of sale system 204 requests price information from the product association database and adds (250) the bottom of basket products to the sales transaction.

The loss prevention system 210 receives (252) the bottom of basket product codes and tracks the bottom of basket products. For example, the loss prevention analytics module tracks the percent of bottom of basket items that are store products. In some implementations, the loss prevention analytics module tracks the products and types of products that were located on the lower support unit of the customer's shopping cart. The loss prevention analytics module analyzes the product and product type information and determines trends of the products and types of products located in the lower support unit. The loss prevention analytics module updates (254) the loss prevention database, storing the bottom of basket percentage and trends information in the loss prevention database.

The association analytics module analyzes (256) the scanned product and the scanned bottom of basket products. For example, the association analytics module receives data from the point of sale system 204 indicating if the cashier 202 found a bottom of basket product. The association analytics module adjusts (258) the parameters of the scanned product to reflect whether or not the cashier 202 found a bottom of basket product. If the cashier 202 did not find a bottom of basket product, the likelihood of bottom of basket products for the scanned product decreases. The association analytics module updates (260) parameters stored in the product association database to reflect the change in likelihood (e.g., the decrease in likelihood).

If the cashier 202 located a bottom of basket product, the association analytics module updates parameters associated with the scanned product to reflect the increased possibility of bottom of basket products during transactions that include the scanned product. For example, the association analytics module updates the bottom of basket value for the Blu-ray player purchased by the customer, such that future transactions with the Blu-ray player have a higher possibility of bottom of basket products than before. In some implementations, the association analytics module uses the input received by the user interface that indicates whether or not a bottom of basket product was located by the cashier 202 for training. The association analytics module updates bottom of basket values during training in order to increase the accuracy of the association analytics module in determining the possibility of bottom of basket products.

When all of the products in the customer's shopping cart have been added to the transaction, the cashier 202 indicates (262) that all products have been scanned. The user interface of the point of sale system 204 receives input from the cashier 202 and a register system, such as the register system 112, finalizes (264) the sales transaction, including receiving payment for the purchased products and printing of a customer receipt.

The analytics system 208 receives sales transaction information from the point of sale system 204 and a sales analytics module, such as the sales analytics module 128, analyzes (266) the sales data for trends. In some implementations, the association analytics module analyzes the completed transaction data for information regarding bottom of basket products, such as bottom of basket products identified, and the relationship between bottom of basket products purchased and other purchased products.

The sales analytics module adjusts (268) sales trends based on the new sales transaction information received from the point of sale system 204. In some implementations, the association analytics module adjusts the product parameters used by the association analytics module in determining the possibility of bottom of basket products in order to reflect relationships between all products purchased and any bottom of basket products. For example, if the sales transaction does not include any products located on the lower support of the customer's shopping cart, each of the bottom of basket values for the purchased products is adjusted (e.g., the value is decreased) to reflect a lower likelihood of bottom of basket products.

Alternatively, if the sales transaction included one or more bottom of basket products, the bottom of basket values for the purchased products are adjusted (e.g., the values are increased) to reflect a higher possibility of bottom of basket products. During future purchases of the products, the association analytics module is more likely to determine that the possibility of bottom of basket products is above a threshold value and a cashier needs to inspect the lower support unit of the shopping cart.

In some implementations, increasing the values of parameters associated with a scanned product, such as the bottom of basket value, does not imply that the association analytics module will determine that the possibility of a complementary bottom of basket product is above the threshold value the next time the scanned product is purchased during a transaction. Continuing the example, in some cases the bottom of basket value will need to be increased a number of times before the bottom of basket value is above the threshold value. Similarly, if the bottom of basket value for a product indicates that a purchase of the product is likely to contain products located in the lower support unit, and no bottom of basket products are found, the bottom of basket value will decease. Continuing the example, if, over time, the bottom of basket value continues to decrease, the product will eventually no longer be indicative of being associated with a complementary product in the lower support unit of the shopping cart. In certain implementations, updating the product parameters for all products purchased during a transaction helps to identify new products that are indicative of bottom of basket products or old products that are no longer indicative of bottom of basket products.

In some implementations, the sales analytics module analyzes sales data and adjusts sales trends on a schedule instead of after each transaction. For example, the sales analytics module updates sales trends once a week. In some implementations, the association analytics module is trained on a schedule using sales and product association data. For example, the association analytics module is trained monthly or seasonally, to name a few examples.

The database access system 206 updates (270) the sales transaction database and the product association database with the adjusted trends and product parameters respectively. For example, the sales trends database is updated with adjusted trends information for use by an inventory system, such as the inventory system 104. The inventory system uses the trends information to change product stock levels at the store during different times of the year.

Figure 3A:
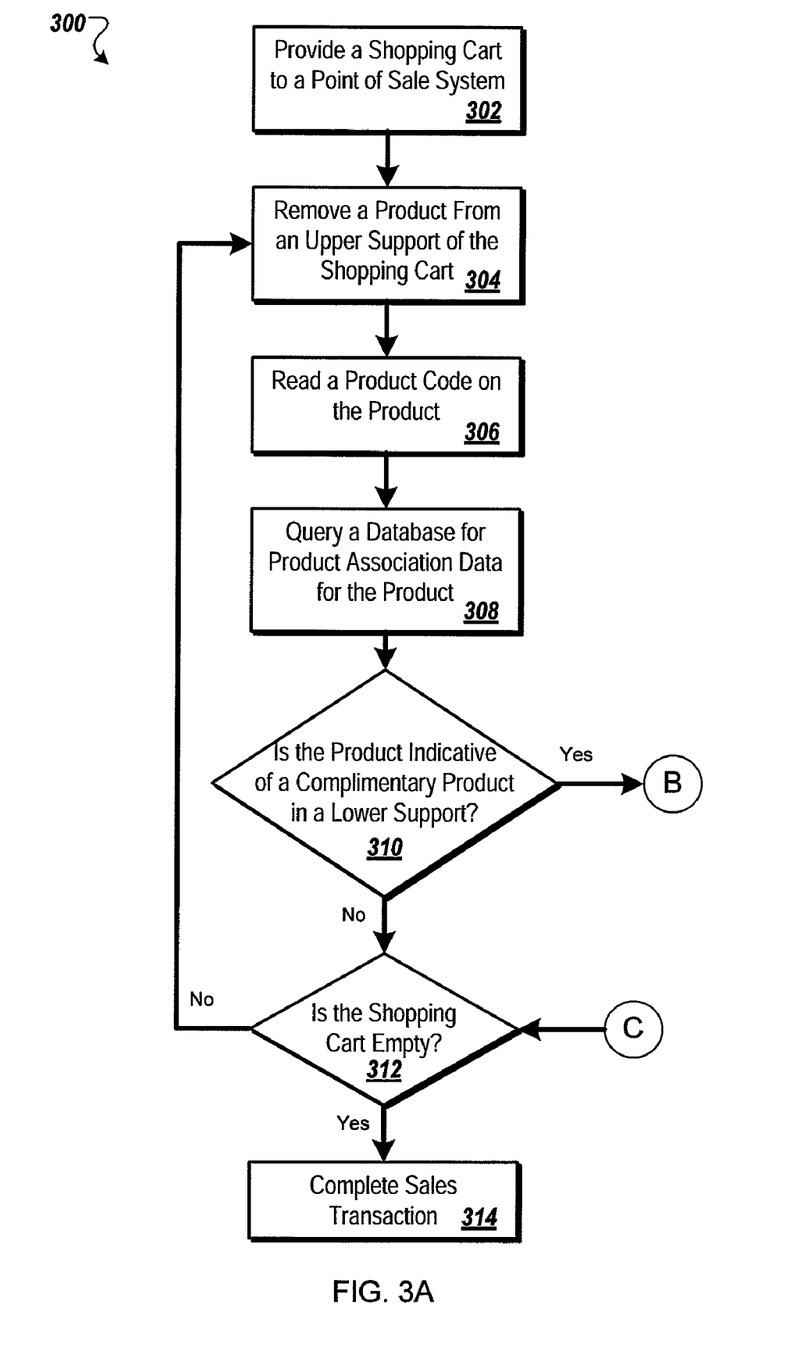
FIGS. 3A-B show a flow chart of an example process for displaying a bottom of basket notification and updating product association data.
Figure 3B:
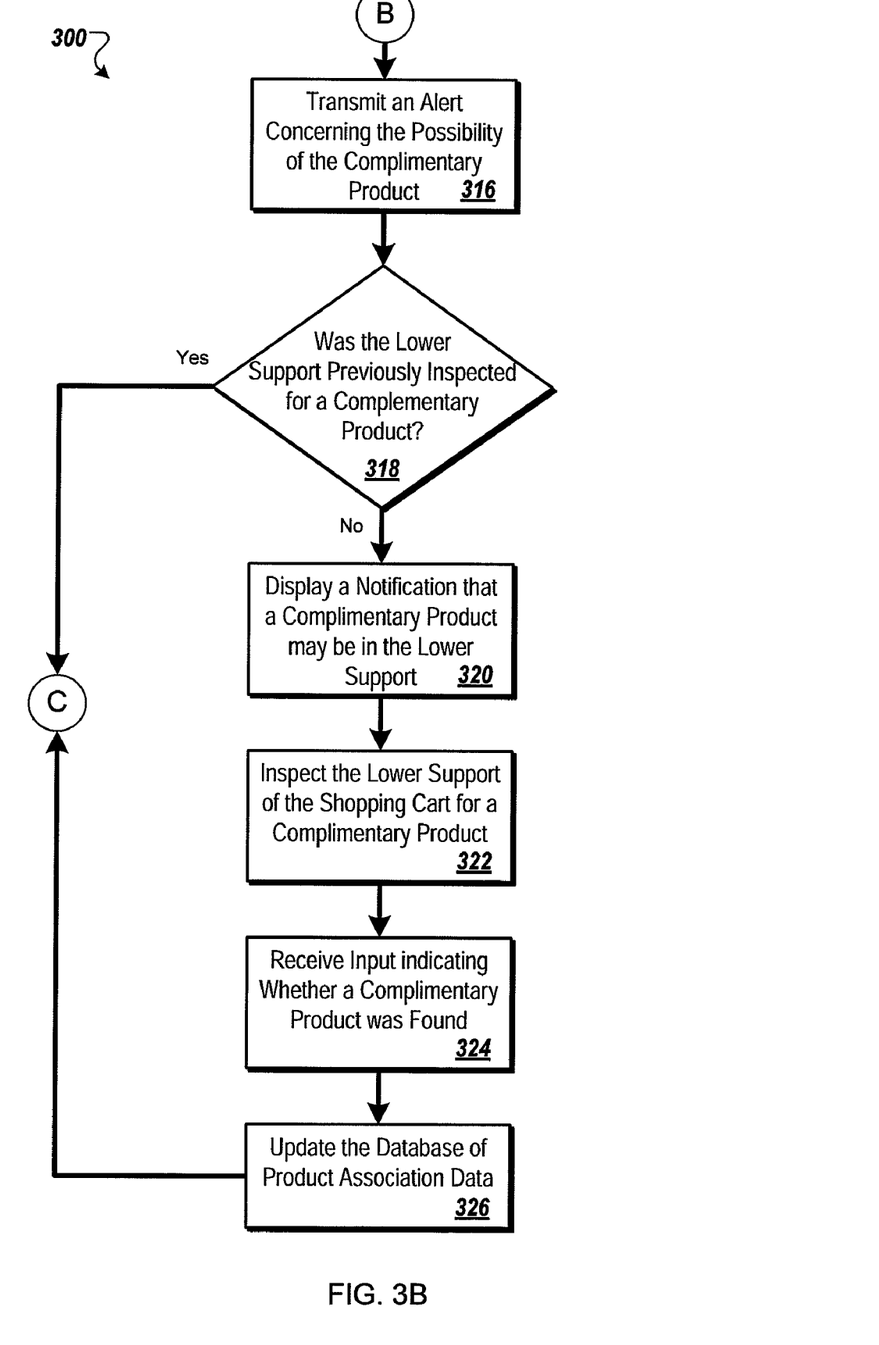

FIGS. 3A-B depict a flow chart of an example process 300 for determining if a lower support unit of a shopping cart includes products. The system 100 and parts thereof will be referred to in the following as examples. In other implementations, the process 300 is performed by other systems in conjunction with or instead of the system 100.

A customer provides (302) a shopping cart to a point of sale system. For example, the customer pushes a shopping cart into the lane 110 of the point of sale system 102. The shopping cart contains one or more products the customer selected to purchase, such as eleven products. The point of sale system 102 is optionally a customer self checkout system.

A customer removes (304) a product from an upper support unit of the shopping cart. For example, the product is placed on a conveyor belt in the point of sale system 102. The conveyor belt reduces the amount of time the customer spends at the point of sale system 102.

A transducer system reads (306) a product code on the removed product. For example, the customer moves the product across the transducer system 116. The transducer system 116 reads a UPC code located on the product and sends the UPC code to the register system 112. In other implementations, a cashier uses the transducer system 116 to read the UPC code located on the product.

A database access system queries (308) a database for data associated with the product. For example, the point of sale system 102 transmits a request to the database access system 118 for the price of the product. In addition to the product price, the database access system 118 queries the product association database 120 for product parameters, such as the bottom of basket value, that are indicative of the possibility of complementary products located in a lower support unit of the shopping cart.

The bottom of basket value indicates whether or not a purchase of the scanned product includes bottom of basket products at a frequency greater than a threshold value. In some implementations, the bottom of basket value is "Yes" if the frequency that bottom of basket products are found is greater than the threshold value and "No" otherwise. If bottom of basket products are located at least about 60% of the time the scanned product is purchased, the bottom of basket value indicates that the lower support unit should be inspected. In other implementations, the threshold value is 70% and if bottom of basket products are detected at least 70% of the time the scanned product is purchased, the bottom of basket value is indicative of bottom of basket products. In certain implementations, when complementary products are located in the lower support unit of a shopping cart at least 80% of the time the scanned product is purchased, the bottom of basket value indicates that the lower support unit should be inspected. If products are located in the lower support of a shopping cart at a frequency less than the threshold value (e.g., less than 50% of the time), then the bottom of basket value indicates that the scanned product is not indicative of complementary bottom of basket products.

The database access system determines (310) whether the product is indicative of a complementary product on a lower support unit. For example, the database access system 118 determines if the bottom of basket value for the scanned product indicates that bottom of basket products are located at a frequency above the threshold amount and whether the bottom of basket should be inspected.

If the scanned product is not indicative of a bottom of basket product, the customer determines (312) if the shopping cart is empty. If the shopping cart is empty, the customer completes (314) the sales transaction at the point of sale system 102. In other implementations, a cashier determines if the shopping cart is empty during step 312 and completes the sales transaction during step 314 if the shopping cart is empty. If the shopping cart is not empty, the process 300 proceeds to step 302. For example, the customer removes another product from the shopping cart. For example, the customer removes and scans the remaining ten products from the shopping cart using the process 300 and then completes the sales transactions.

If the scanned product is indicative of a bottom of basket product, the database access system transmits (316) an alert concerning the possibility of the complementary product to an alert module. For example, the database access system 118 transmits the alert to the alert module 122 in the point of sale system 102.

The alert module determines (318) if the lower support unit was previously inspected for a complementary product during the current transaction. For example, the alert module 122 determines if the database access system 118 previously sent a complementary product alert to the alert module 122 during the current transaction and the lower support unit was already inspected. If the alert module 122 determines that the lower support unit was already inspected, the process 300 proceeds to step 312.

If the lower support unit was not already inspected during the current transaction, a user interface displays (320) notification that a complementary product might be located in the lower support unit. For example, the alert module 122 sends a notification to the user interface 114, and the user interface 114 displays a notification to the customer requesting that the customer inspect the lower support unit. In other implementations, a notification is displayed on a user interface presented to an attendant monitoring the point of sale system 102 (e.g., an attendant monitoring a number of self checkout systems). The notification instructs the attendant to inspect the lower support unit of the customer's shopping cart for bottom of basket products.

The customer inspects (322) the lower support unit of the shopping cart for a complementary product. For example, the customer inspects the lower support unit of their shopping cart to see if they placed a product on the lower support and have not yet scanned the product during the transaction. In other implementations, the attendant checks to make sure the customer scans bottom of basket products.

The user interface receives (324) input indicating whether a complementary product was found. For example, the display prompting the customer to inspect the lower support unit includes a "Yes" and a "No" response button that allow the customer to indicate if they found a product on the lower support unit of their shopping cart. In other implementations, the user interface presented to an attendant receives input from the attendant specifying if there was or was not product located on the lower support unit of the customer's shopping cart.

An association analytics module updates (326) the database of product association data. For example, the point of sale system 102 transmits product information for the scanned product and the indication of whether a complementary product was found to the association analytics module 130. The association analytics module 130 analyzes product association data for the scanned product from the product association database 120 and the indication if a complementary product was found. In some implementations, the association analytics module 130 adjusts the product association data based on the indication if a complementary product was found and updates the product association database 120 accordingly.

For example, if the association analytics module 130 determines that the frequency of locating bottom of basket products for the scanned product in response to display of the notification is less than the threshold value, the bottom of basket value is adjusted to indicate that the scanned product is not indicative of complementary products being located in a lower support unit. In another example, if the association analytics module 130 analyzes the product association data and the indication of a complementary product and determines that the complementary product is found at a frequency greater than the threshold level, the association analytics module updates the bottom of basket value for the scanned product to indicate that the lower support unit should be inspected during transactions that include the scanned product.

Figure 4A:
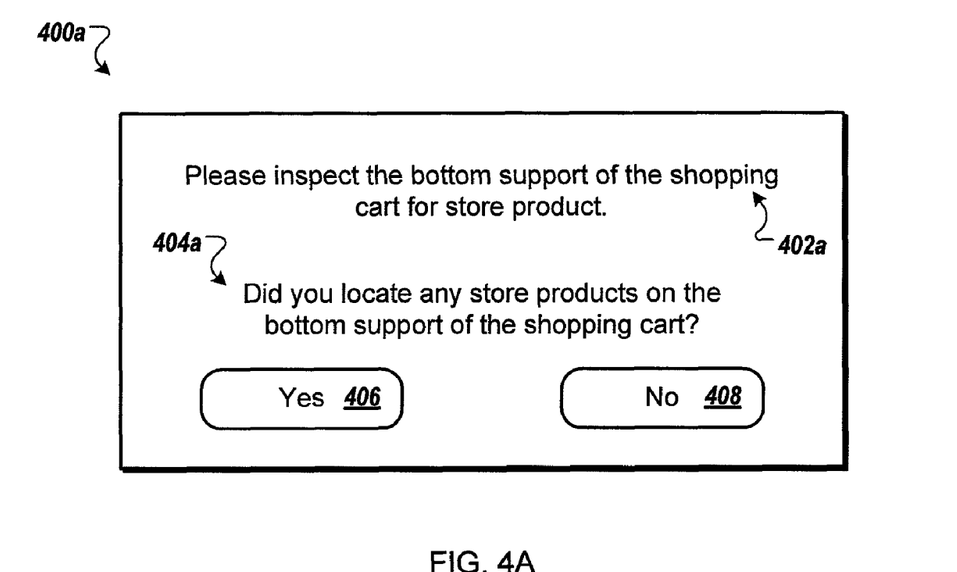
FIGS. 4A-B show examples of user interfaces for displaying a notification of the possibility a shopping cart contains products in the bottom of basket.

FIG. 4A is an example of a notification 400a displayed on a user interface. In some implementations, the notification 400a is presented to a cashier or a customer on the user interface 114. In other implementations, the notification 400a is displayed to an attendant, head cashier, or supervisor on a user interface included in a kiosk or counter.

The notification 400a includes a message 402a instructing the cashier to inspect a bottom support unit of a customer's shopping cart for products to scan during a sales transaction. The notification 400a includes a prompt 404a asking the cashier if they located any products on the bottom support unit. The notification 400a includes a yes response button 406 and a no response button 408. If the cashier locates products on the bottom support unit of the customer's shopping cart, then the cashier selects the yes response button 406.

Alternatively, if the cashier does not located products on the bottom support unit, the cashier selects the no response button 408. In some implementations, the notification 400a receives the user input and sends the user input to the point of sale system 102. An analytics module, such as the association analytic module 130, receives the user input from the point of sale system 102 and updates product parameters used to determine whether a scanned product is indicative of bottom of basket products.

Figure 4B:
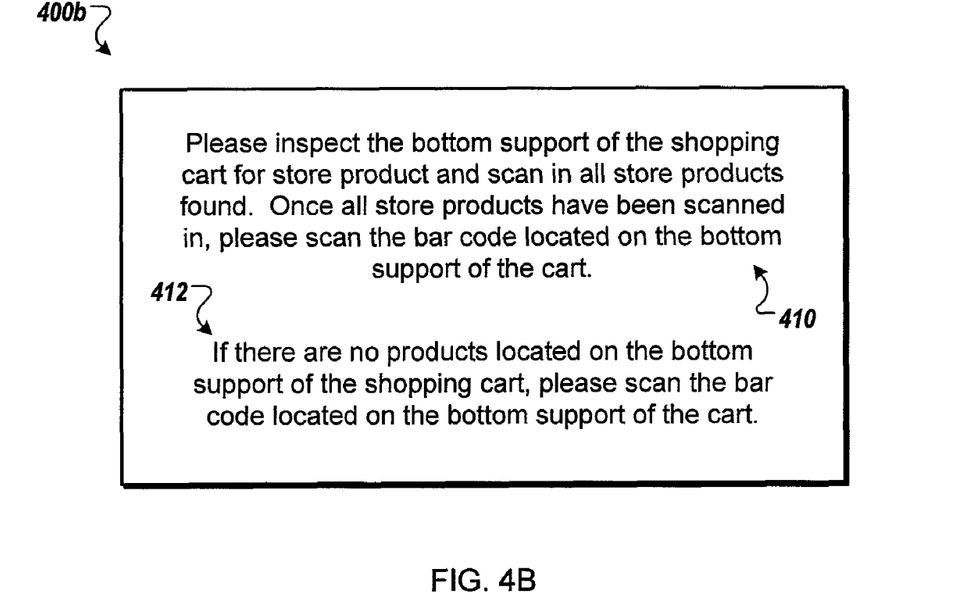

FIG. 4B is another example of a notification 400b for prompting a user, such as a cashier, a customer, or an attendant to inspect the bottom support unit of a customer's shopping cart. The notification 400b is displayed on the user interface 114 of the point of sale system 102.

The notification 400b includes a message 410 with instructions for what actions to take if product is located on the bottom support unit. For example, the cashier scans the products located on the bottom support unit with the transducer system 116. Once all of the products on the bottom support unit have been scanned, the cashier scans a bar code located on the bottom support unit to indicate that there are no additional products located on the bottom support unit.

The association analytics module 130 uses sales transaction data indicating products located in the top support unit and products located in the bottom support unit in determining the frequency of products located in the bottom support unit and product association data (e.g., when product A is purchased by a customer, the customer is likely to purchase product B). The association analytics module 130 analyzes the sales transaction data after each transaction is finalized. In other implementations, the association analytics module 130 analyzes sales transaction data on a daily, weekly, or monthly basis.

The notification 400b also includes a message 412 with instructions if there are not any products located on the bottom support unit. For example, the cashier scans a bar code located on the bottom support of the cart.

Figure 5:
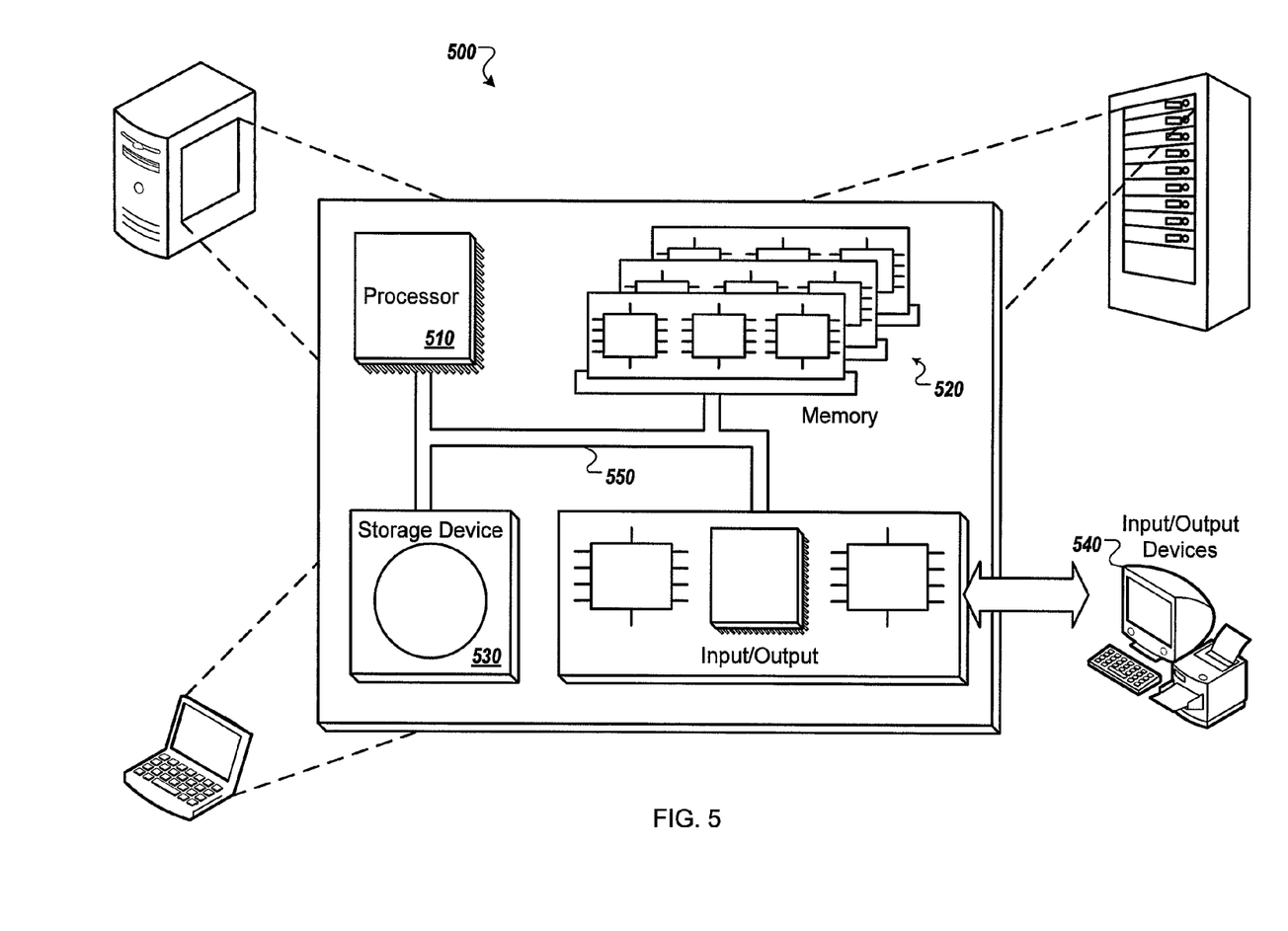
FIG. 5 is a block diagram of a computing system optionally used in connection with computer-implemented methods described in this document.

FIG. 5 is a schematic diagram of a generic computer system 500. The system 500 is optionally used for the operations described in association with any of the computer-implemented methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 is optionally a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory including, by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A method comprising:
providing a point of sale station including a lane and a register system, wherein the register system comprises a user interface and a transducer system to read product codes borne by products available for purchase at the point of sale station;
providing a shopping cart to carry a plurality of said products along the lane of the point of sale station, wherein the shopping cart has an upper product support unit and a lower product support unit, wherein the lower product support unit is partially obscured from the view of a user positioned at the register system when the shopping cart is in a first operative position adjacent the register system;
reading, with the transducer system, a first product code borne by a first product removed from the upper product support unit of the shopping cart;
determining, with a computer-implemented analytics module, based on the first product code whether the first product is indicative of a presence of a product complementary to the first product in the lower product support unit of the shopping cart, wherein the determining is executed at least in part by a database access system that queries a database for data associated with the first product code and wherein the data includes one or more parameters indicative of at least a possibility that a complementary product may be contained in the lower product support unit;
transmitting to a module of the point of sale station an alert that a complementary product may be contained in the lower product support unit;
displaying on the user interface a notification concerning the possibility that a complementary product may be contained in the lower product support unit in response to the alert.

2. The method of claim 1, further comprising inspecting the lower product support unit of the shopping cart in response to the notification.

3. The method of claim 1, further comprising receiving input from the user indicating whether a complementary product was located in response to the notification.

4. The method of claim 3, further comprising repeating the reading, determining, transmitting, and displaying steps in connection with a single retail transaction.

5. The method of claim 4, further comprising tracking a frequency with which complementary products are located or a frequency with which complementary products are not located in response to the notifications.

6. The method of claim 5, further comprising adjusting one or more parameters associated with the first product based on the frequency with which complementary products are located or the frequency with which complementary products are not located in response to the notification.

7. The method of claim 6, wherein the one or more parameters are adjusted such that the frequency with which complementary products are located in response to the notification is at least about 60%.

8. The method of claim 6, wherein the one or more parameters are adjusted such that the frequency with which complementary products are located in response to the notification is at least about 70%.

9. The method of claim 6, wherein the one or more parameters are adjusted such that the frequency with which complementary products are located in response to the notification is at least about 80%.

10. A system comprising:
a transaction station including a lane and a register system, wherein the register system comprises a graphical interface and a sensor system to read product identifiers borne by products available for purchase at the transaction station, and wherein the lane is configured to receive a transport device, wherein the transport device is configured to carry a plurality of products to the transaction station and has a top support unit and a bottom support unit that is partially obscured from the view of a user positioned at the register system when the transport device is in a first operative point adjacent the register system, and wherein the graphical interface is configured to display a notification concerning the possibility that a complementary product may be contained in the bottom support unit;
a product database including a plurality of product identifiers for the products available for purchase and data associated with the product identifiers, wherein the data associated with the product identifiers includes one or more values indicative of at least a possibility that a complementary product may be contained in the bottom support unit; and
a computer-implemented identification module to determine whether a first product removed from the top support unit of the transport device is indicative of a presence of a product complementary to the first product in the bottom support unit of the transport device, wherein the determining is initiated by the identification module upon receiving a first product identifier associated with the first product from the transaction station and is executed at least in part by the identification module querying the product database for data associated with the first product identifier, and wherein the computer-implemented identification module sends a message to the transaction station based upon the determining.

11. The system of claim 10, wherein the transaction station is configured to receive input from the user indicating whether a product complementary to the first product was found on the bottom support unit of the transport device.

12. The system of claim 11, wherein the transaction station receives input from the sensor system indicating whether a product complementary to the first product was found on the bottom support unit of the transport device.

13. The system of claim 11, wherein the identification module tracks a frequency with which complementary products are located or a frequency with which complementary products are not located based on the input.

14. The system of claim 13, wherein the identification module adjusts one or more values stored in the product database based on the frequency with which complementary products are located or the frequency with which complementary products are not located.

15. The system of claim 14, wherein the identification module adjusts one or more values stored in the product database for each of the plurality of products located in the transport device.

16. The system of claim 10, wherein the identification module sends the message to the transaction station based on a determination that a likelihood that complementary products will be located is at least about 60%.

17. The system of claim 10, wherein the identification module sends the message to the transaction station based on a determination that a likelihood that complementary products will be located is at least about 70%.

18. The system of claim 10, wherein the identification module sends the message to the transaction station based on a determination that a likelihood that complementary products will be located is at least about 80%.

19. A non-transitory physical computer-readable medium, embodied in a device, on which medium is encoded program code configured for execution by a processor to perform a method for determining a possibility that a complementary product may be located in a shopping carriage having an upper product support unit and a lower product support unit, the method comprising:

receiving from a product scanning apparatus a first product code borne by a first product removed from a shopping carriage, wherein the product scanning apparatus is part of a checkout system in which the lower product support unit of the shopping carriage is partially obscured from the view of a user positioned at the checkout system when the shopping carriage is in a first operative location adjacent the checkout system;

determining based on the first product code whether the first product is indicative of the presence of a product complementary to the first product in the lower product support unit of the shopping carriage, wherein the determining is executed at least in part by a repository access system that queries a product information repository for data associated with the first product code, and wherein the data includes one or more parameters indicative of at least the possibility that complementary products may be contained in the lower product support unit; and transmitting to a component of the checkout system an alert that complementary products may be contained in the lower product support unit, wherein the checkout system includes a display configured to present a notification concerning the possibility that a complementary product may be contained in the lower product support unit.

20. The medium of claim 19 wherein the method further comprises receiving input from the user indicating whether a product complementary to the first product was found on the lower product support unit of the shopping carriage.

* * * * *